United States Patent [19]
Luther

[11] Patent Number: 5,533,127
[45] Date of Patent: Jul. 2, 1996

[54] ENCRYPTION SYSTEM

[75] Inventor: Willis J. Luther, Irvine, Calif.

[73] Assignee: Canon Information Systems, Inc., Costa Mesa, Calif.

[21] Appl. No.: 214,563

[22] Filed: Mar. 18, 1994

[51] Int. Cl.$^6$ .............................. H04L 9/28; H04L 9/00
[52] U.S. Cl. .................... 380/28; 380/9; 380/10; 380/14; 380/49
[58] Field of Search ............................ 380/4, 5, 9, 10, 380/14, 18, 28, 49, 50

[56] References Cited

U.S. PATENT DOCUMENTS

| | | | |
|---|---|---|---|
| 2,437,255 | 3/1948 | Hogan et al. | 380/54 |
| 2,889,399 | 6/1959 | Hammond, Jr. | 380/11 |
| 3,084,453 | 4/1963 | Brown | 38/54 |
| 4,177,485 | 12/1979 | Prehn | 380/18 |
| 4,177,486 | 12/1979 | Prehn | 380/18 |
| 4,322,577 | 3/1982 | Brandstrom | 380/29 X |
| 4,392,021 | 7/1983 | Slate | 380/11 |
| 4,459,611 | 7/1984 | Arai et al. | 380/14 |
| 4,641,346 | 2/1987 | Clark et al. | 380/3 |
| 4,668,103 | 5/1987 | Wilson | 380/50 X |
| 4,776,013 | 10/1988 | Kafri et al. | 380/54 |
| 4,796,298 | 1/1989 | MacArthur | 380/14 |
| 4,945,564 | 7/1990 | Christian et al. | 380/14 |
| 4,972,475 | 11/1990 | Sant'Anselmo | 380/50 X |
| 5,142,576 | 8/1992 | Nadan | 380/20 |
| 5,177,786 | 1/1993 | Kang | 380/10 |
| 5,295,188 | 3/1994 | Wilson et al. | 380/9 X |
| 5,412,729 | 5/1995 | Liu | 380/28 X |

Primary Examiner—Bernarr E. Gregory
Attorney, Agent, or Firm—Fitzpatrick, Cella, Harper & Scinto

[57] ABSTRACT

A system for encrypting two-dimensional data such as image data, or data like multi-media data which can be transformed into two-dimensional data. The data is encrypted by multiple encryption passes through the data. In each pass, each mth row and each nth column of data is encrypted by complementation of the data in the row or column. For each encryption pass, m and n are randomly selected. The encryption system converts non-two-dimensional data to a pseudo-two-dimensional format by computing the square root of the binary length of the non-two-dimensional data file.

37 Claims, 9 Drawing Sheets

S201 — GET RANDOMIZER SEED VALUE (SEED) ◄──────── EXTERNAL SOURCE
S202 — SRAND (SEED) // SET THE SEED
S203 — "StripeHeight" = GetRandomNumber(1,5); // FROM 1 TO 5 "LINES"
S204 — INVERT ENTIRE IMAGE.
S205 — SRAND(SEED) // RESET THE SEED
S206 — "NumberPasses" = GetRandomNumber(3,37) // e.g. FROM 3 TO 37
S207 — "CurrentPass" = 0
   300 —◯◄
S208 ──── "HorizInterval" = GetRandomNumber(2,19) // e.g. FROM 2 TO 19
S209 ──── "VertInterval" = GetRandomNumber(2,19) // e.g. FROM 2 TO 19
S210 ──── "CurrentRow" = HorizInterval
     301 —◯◄
S211 ──────── InvertBits( ImageBuffer, 0, "CurrentRow", "|WIDTH", "StripeHeight")
S212 ──────── ADD "HorizInterval" TO "CurrentRow"
S213 ──────── IF "CurrentRow" < "|HEIGHT"
S214 ──────── "CurrentCol" = VertInterval     302
     303 —◯◄
S215 ──────── InvertBits(ImageBuffer, "CurrentCol", 0, "StripeHeight", "|HEIGHT")
S216 ──────── ADD "VertInterval" TO "CurrentCol"
S217 ──────── IF "CurrentCol" < "|WIDTH"
S218 ──────── INCREMENT "CurrentPass"    304
S219 ──────── IF "CurrentPass" < "NumberPasses"
                                    305

FIG. 8

ENCRYPTION SYSTEM

BACKGROUND OF THE INVENTION

1. Field of the Invention

The present invention is directed to an encryption system, particularly an encryption system for two-dimensional data, such as image data. Specifically, the invention involves encrypting two-dimensional data by multiple encryption passes through the data, wherein in each pass, each mth row and each nth column of data is encrypted, and wherein for each encryption pass m and n are randomly selected.

2. Description of the Related Art

With increasing use of electronic communication systems such as computerized electronic mail ("E-mail") or facsimile transmissions, there is renewed interest in encryption systems to preserve the confidentiality and security of those communications. Many encryption techniques have been proposed and are now in use, but efforts are continuously being made to increase the ease of encrypting data as well as the difficulty in deciphering the encrypted data.

Encrypting systems which scramble the order of letters and characters on an original document are well known in the communication art. Such systems are similar in their objects to the data encrypter of the present invention, but are quite different in structure and the method of operation.

SUMMARY OF THE INVENTION

It is an object of the invention to provide an encryption system for two-dimensional data such as image data or data like multi-media data which can be transformed into two-dimensional data.

According to the invention, the data is, or is converted to, two-dimensional binary data, which is encrypted by multiple encryption passes through the binary data. In each pass, each mth row and each nth column of binary data is encrypted, such as by complementation of the data in the row or column. For each encryption pass, m and n are randomly selected and have a value which is small relative to the size of the data.

BRIEF DESCRIPTION OF THE DRAWINGS

FIG. 8 is a pseudo-code flow chart of the second embodiment of the invention for encrypting two-dimensional data.

DETAILED DESCRIPTION OF THE INVENTION

Figure 1:
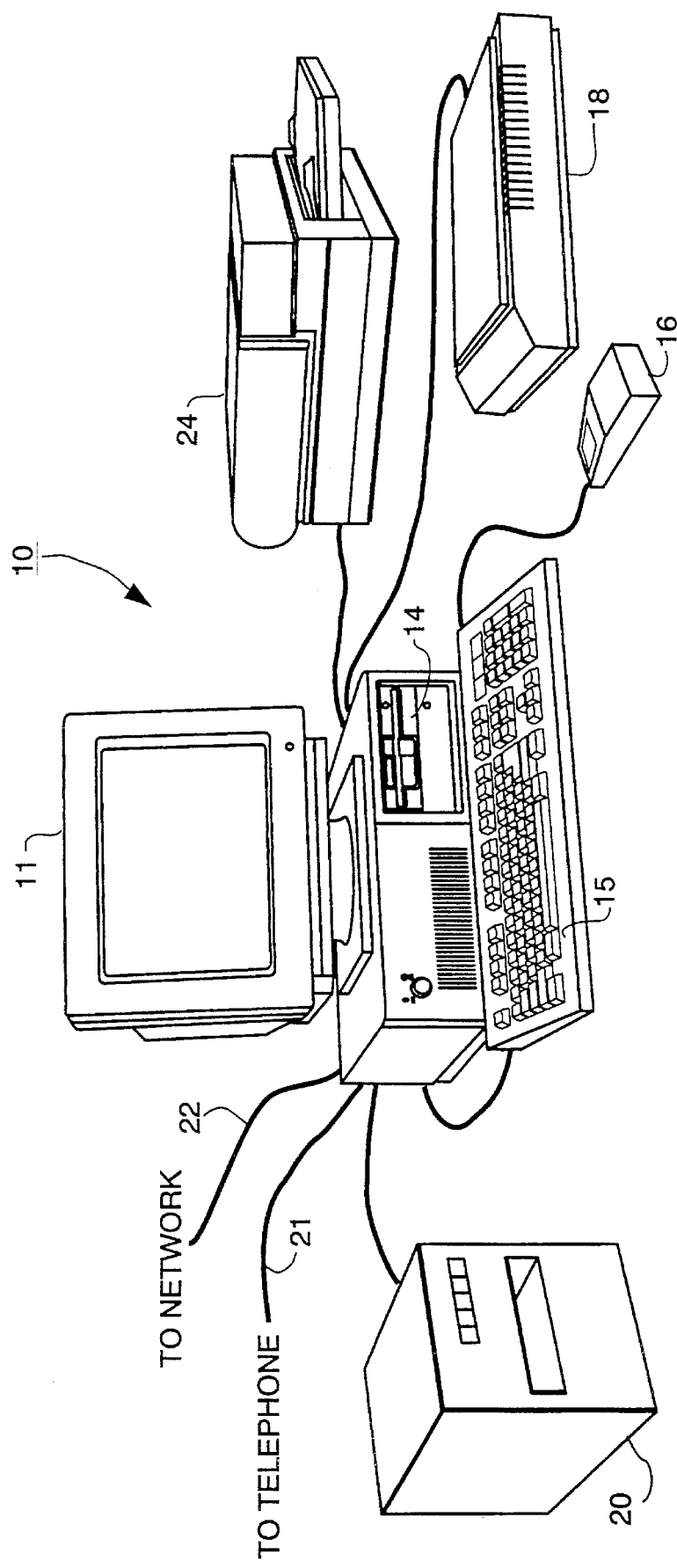
FIG. 1 is a perspective view of the external appearance of an apparatus according to the invention.

FIG. 1 is a view showing the outward appearance of a representative embodiment of the invention. Shown in FIG. 1 is computing equipment 10 such as an IBM-PC or PC-compatible computer. The computing equipment 10 is provided with a display screen 11 such as a color monitor. Computing equipment 10 further includes a mass storage device such as computer disk drive 14 for storing data files such as black-and-white, halftone and color bitmap images, sound data, text data and other multi-media data; and for storing application program files which contain stored program instruction sequences by which computing equipment 10 manipulates data files and presents data in those files to a computer operator via display screen 11. For example, the application programs on disk drive 14 include an encryption program for encrypting the data files.

A keyboard 15 is connected to computing equipment 10 to permit selection of application programs, and the input of text data and to permit operator selection and manipulation of data displayed on display screen 11. Likewise, a pointing device 16 such as a mouse or the like is provided to permit selection and manipulation of objects on the display screen. Scanner 18 scans documents or other images and provides bitmap images of those documents to computing equipment 10. Those images may be used immediately by computing equipment 10, or computing equipment 10 may store the image in disk drive 14. Bitmap image data may be retrieved from the computer disk drive 14 for subsequent processing or encryption by computing equipment 10.

Other means for supplying bitmap image data and other data may be provided, such as telephone link 21 via an unshown modem, or a network link 22. This data, for example, may be provided to links 21 and 22 via a facsimile 20 or via an E-mail system. Such data may be encrypted, as described more fully below.

Printer 24 is provided for outputting information processed by computing equipment 10.

In accordance with computer operator instructions, stored application programs are selectively activated to process and manipulate data. For example, and as described in more detail below, an encryption program may be provided for operator selection and use.

Figure 2:
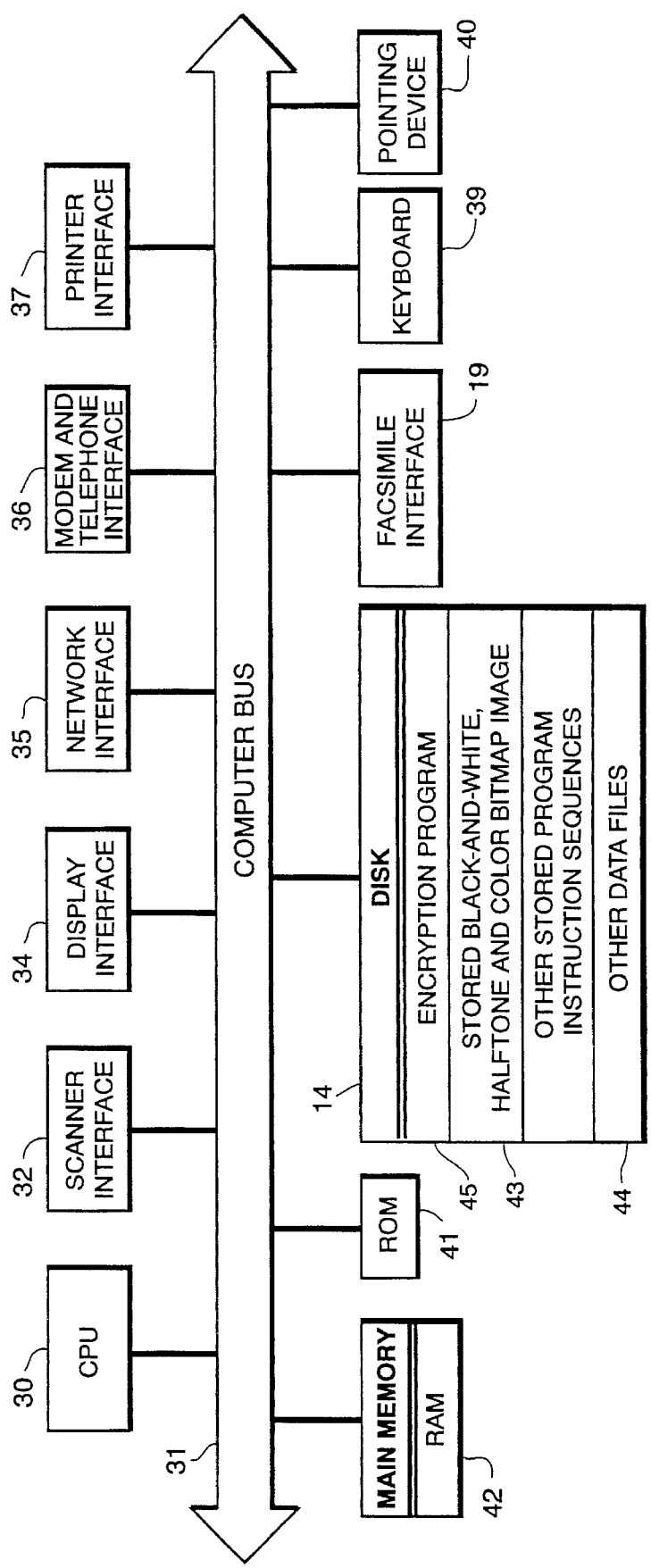
FIG. 2 is a block diagram of the FIG. 1 apparatus.

FIG. 2 is a detailed block diagram showing internal construction of computing equipment 10. As shown in FIG. 2, computing equipment 10 includes a central processing unit (CPU) 30 such as an 80386 or a reduced instruction set computer (RISC) interfaced to computer bus 31. Also interfaced to computer interface 31 is scanner interface 32 for interfacing to scanner 18, display interface 34 for interfacing to display 11, network interface 35 for interfacing to network line 22, facsimile interface 19 for interfacing to facsimile 20, modem and telephone interface 36 for interfacing to telephone line 21, printer interface 37 for interfacing to printer 34, keyboard interface 39 for interfacing to keyboard 15, and pointing interface 40 for interfacing with pointing device 16.

Read only memory (ROM) 41 interfaces to computer bus 31 so as to provide CPU 30 with specialized and invariant functions such as start-up programs or BIOS programs. Main memory 42 provides CPU 30 with random access memory storage both for data and application programs, as required. In particular, when executing stored program instruction sequences, CPU 30 normally loads those instruction sequences from disk 14 (or other program storage medium) into main memory 42 and executes those stored program instruction sequences out of the main memory.

As further mentioned above, computer disk drive 14 includes data files, for example, data files such as data files 43 representing black-and-white, halftone and color bitmap images or other data files 44 representing sound data, text data, E-mail data, etc., each of which may require encryption for protecting the confidentiality of the data. Disk drive 14 also includes an encryption program 45 for encrypting the data files 43 and the other data files 44, as described more fully below.

It is to be appreciated that other computer system configurations may be utilized in the practice of the invention, such as stand-alone or pre-programmed devices or the like.

Figure 3:
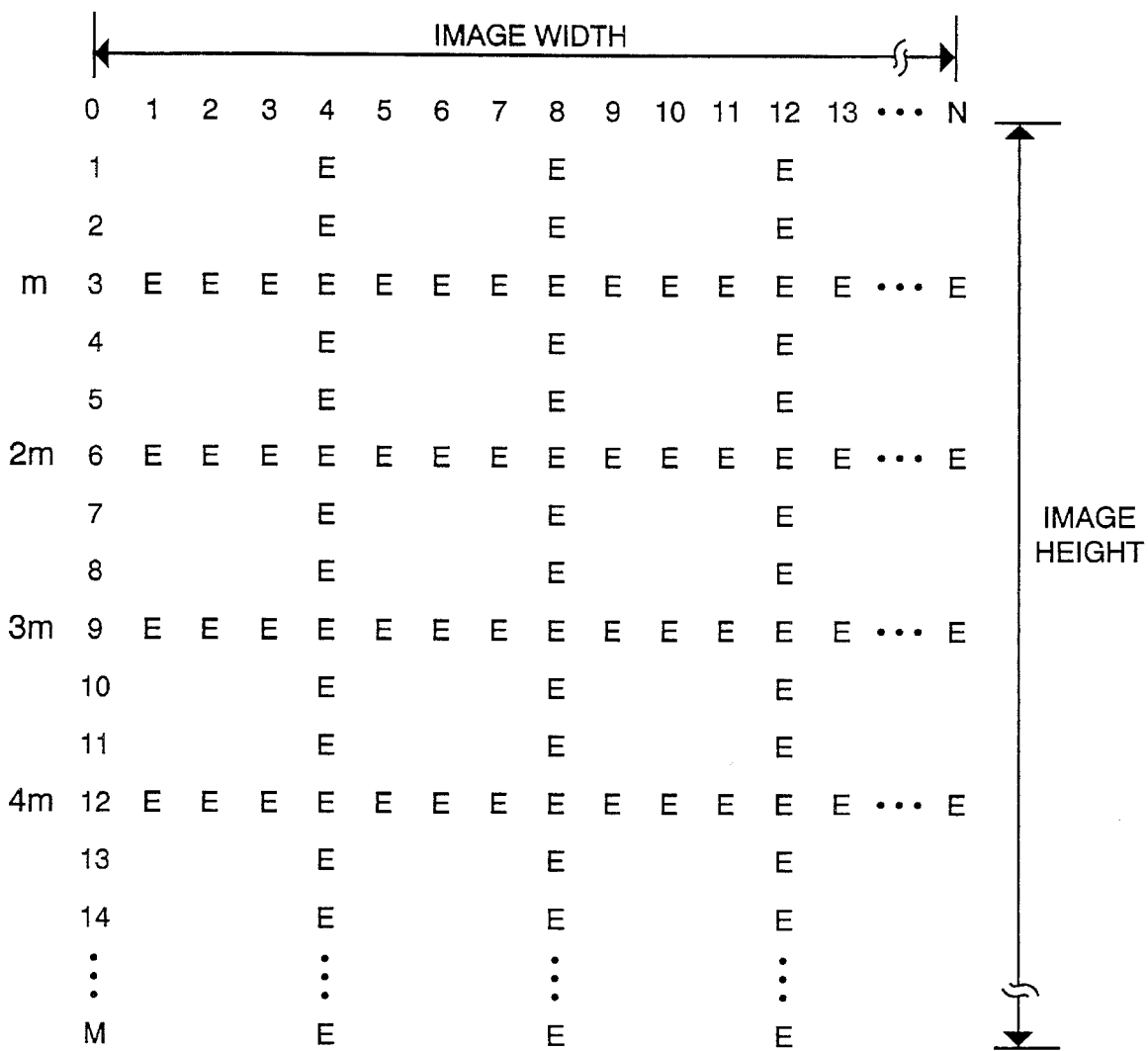
FIG. 3 is a diagram of a M row and N column two-dimensional matrix of data encrypted according to the invention.

FIG. 3 illustrates a rectangular M row and N column two-dimensional matrix of data which may be stored as binary data signals, and which is encrypted according to a first embodiment of the invention. In practice, the size of the two-dimensional matrix is much larger than shown, such as 512 by 512, 512 by 1024, 1024 by 1024 or an even larger matrix. A number Z, of encryption passes, for example 10, may be made to encrypt each mth row and each nth column of data, with the value of m and n being randomly selected for each pass. If in a single pass, for example the first pass, m is selected to be 3 and n is selected to be 4 the matrix is encrypted, with the encrypted portions being shown as E. The un-encrypted portions are shown as a blank space. It is seen that with m equal to 3, the third, sixth, ninth, twelfth and each successive third following row through row M are encrypted, and with n equal to 4 the fourth, eighth, twelfth and each successive fourth following column through column N are encrypted. The encryption is accomplished by complementing the data in each mth row and each nth column in each pass. For example, if in row 3 each bit position is a binary ZERO, the complement would be a binary ONE in each bit position. It is to be appreciated that each position in the matrix can represent a larger piece of data such as a byte, with each of the eight bits in the byte being complemented.

The encryption technique utilizing complementation is applicable to text or black/white image data where there is one bit per pixel. It is also applicable to gray scale or color image data where there are multiple bits per pixel, such as the example above where a byte represents a pixel.

There can be more than one pass, as indicated above, with m and n again being randomly generated for each such pass, to and including a maximum number of passes, which for example, could be ten passes.

The encryption process is operator initiated at keyboard 15 to instruct the CPU 30, via interface 39, to retrieve the encryption program 45 and one of the multi-media data or images from one of the data files 43 or 44 from the disk 14 for storage in RAM 42. If a non-two-dimensional data file is retrieved it is converted to a pseudo-two-dimensional format by computing the square root of the binary length of the file, with the converted data then being stored in the RAM 42. The data is then encrypted as detailed below, and the encrypted image or data file is returned to the disk 14 for storage, or is provided to a remote location via the network interface 35, the modem and telephone interface 36 or the facsimile 20. The encrypted data then may be decrypted at the remote location in a manner identical to the encryption process.

Figure 4:
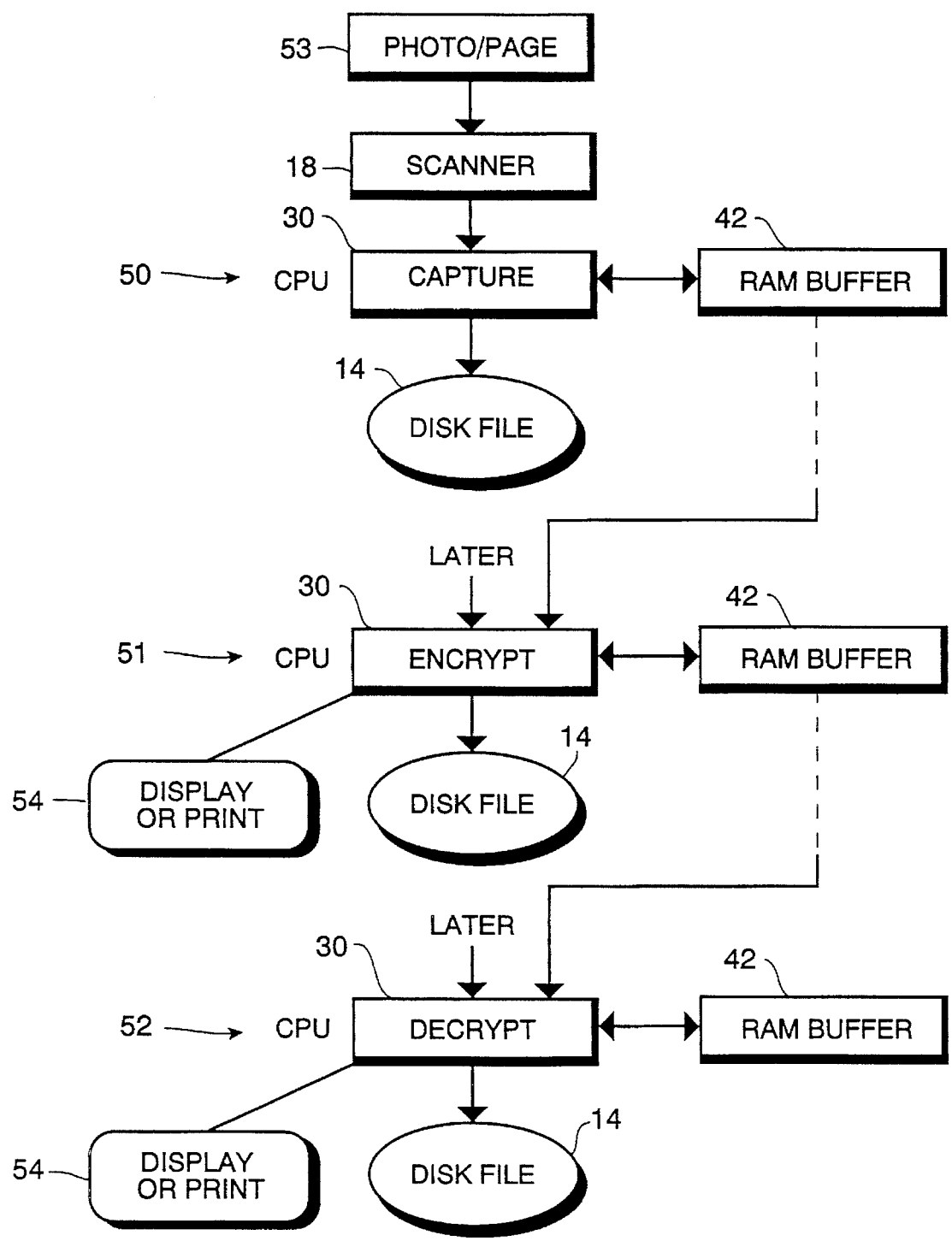
FIG. 4 illustrates a sequence of capturing, encrypting and decrypting data according to the invention.

FIG. 4 illustrates a typical sequence of encrypting and decrypting multi-media data according to the invention. Like elements in FIG. 4 and FIG. 2 have the same numerical designation. Data is captured at 50, encrypted at 51 and decrypted at 52.

In capturing data at 50, the scanner 18 scans a photo/page 53, which for example may be an image or text data, which is processed by the CPU 30 and is then stored on the disk file 14. The captured data or data already on an existing file in disk 14 may be retrieved and stored in the RAM buffer 42 for encryption at 51. The data now stored in the RAM buffer 42 is encrypted, as to be described in detail later, and then may be displayed or printed as indicated at 54, or alternatively is provided to a network for distribution. Alternatively, the encrypted data may be returned to the disk file 14. Decryption at 52 is accomplished by retrieving the encrypted data from the disk file 14 and storing it in the RAM buffer 42 and then decrypting it by the same method as used for encryption.

Figure 5:
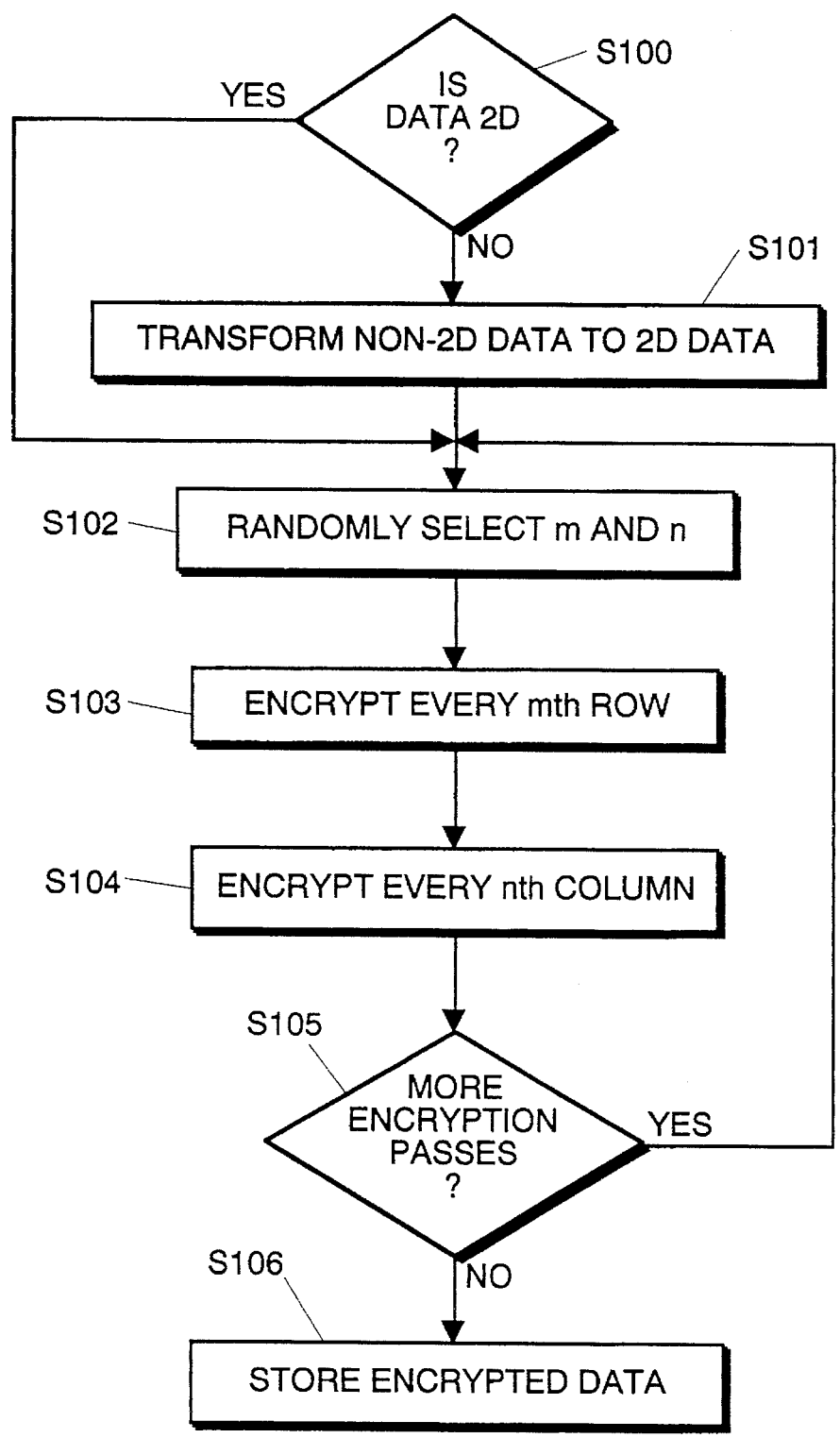
FIG. 5 is a flow chart of a first embodiment of the invention for encrypting two-dimensional data.

FIG. 5 is a flow diagram illustrating how the two-dimensional data matrix of FIG. 3 is encrypted. At step S100 a determination is made as to whether or not input data is two-dimensional. If so flow proceeds to step S102, and if not flow proceeds to step S101 where the non-two-dimensional data is converted to two-dimensional data by computing the square root of the binary length of the non-two-dimensional data file. The numbers m and n are randomly selected at step S102, with every mth row being encrypted at step S103 and every nth column being encrypted at step S104. Steps S103 and S104 may be reversed or interleavedly performed (i.e., first one row and then one column (or vice versa) then another row and another column, etc.). A determination is made at step 105 if more encryption passes are to be made. If so, a return is made to step 102. This loop-back is repeated until all encryption passes are complete, at which time the encrypted data is stored at step S106.

Decryption is performed using the identical procedure as illustrated in FIG. 5. This is so because a decryption process of complementing each mth row and each nth column of an encrypted data matrix in Z passes through the data results in the original unencrypted data matrix, provided the same type random number generator and same seed is utilized for both encryption and decryption.

Figure 6:
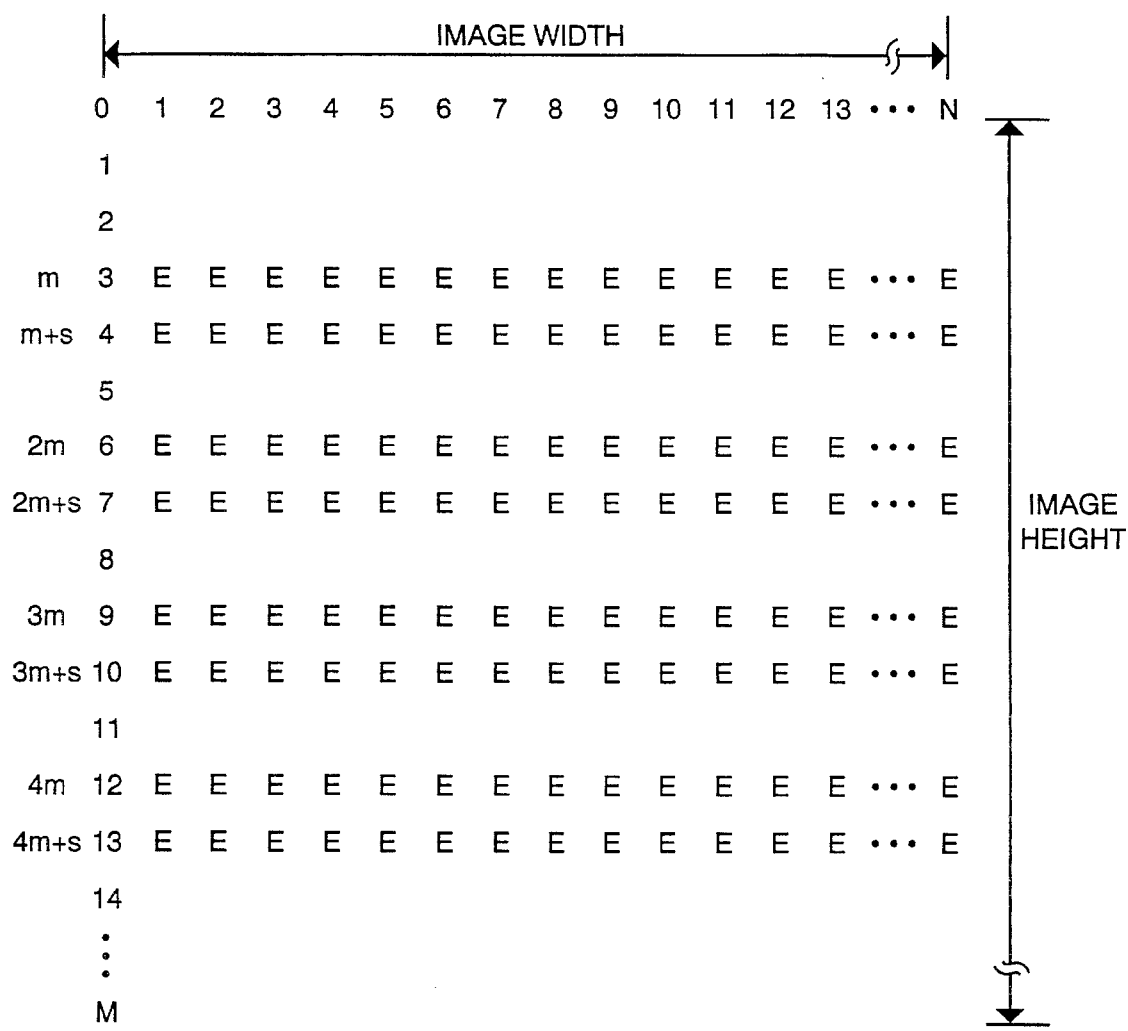
FIG. 6 is a diagram of a M row and N column two-dimensional matrix of data, with the rows encrypted according to a second embodiment of the invention.
Figure 7:
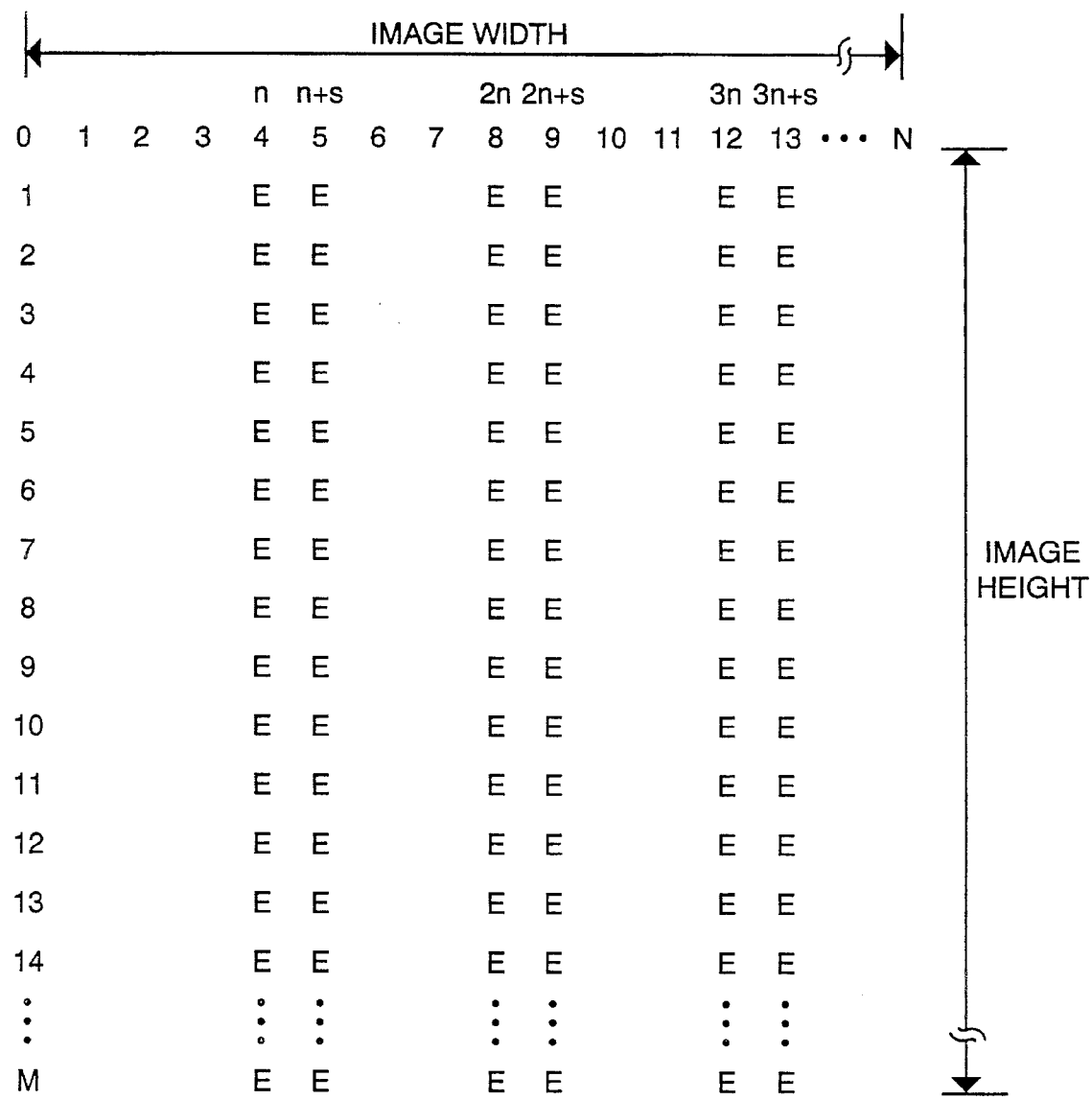
FIG. 7 is a diagram of a M row and N column two-dimensional matrix of data, with the columns encrypted according to the second embodiment of the invention.

In a second embodiment of the invention first the rows M are encrypted as illustrated in FIG. 6, and the columns are encrypted as shown in FIG. 7.

FIG. 6 illustrates how rows of binary data signals in a M row by N column two-dimensional matrix of data signals are encrypted according to the second embodiment of the invention. A random number Z, of encryption passes may be used to encrypt each mth row and S successive following rows, with m and S each being randomly generated. S is referred to as "stripe height". If in a single pass m is selected to be 3 and S is selected to be 1, the third, fourth, sixth, seventh, ninth, tenth, twelfth and thirteenth rows are encrypted, with the encrypted portions being shown as E. If, for example, S were selected to be 2, the above rows would be encrypted as well as the fifth, eighth, eleventh and fourteenth rows. As before, encryption is accomplished by complementing the data in each mth row and the successive S rows following each mth row.

FIG. 7 illustrates how columns in the M row by N column two-dimensional data matrix are encrypted. Again, Z encryption passes are utilized for encrypting each nth column and the S successive following columns, with n and S each being randomly generated. If in a single pass, n is selected to be 4 and S is selected to be 1, the fourth, fifth, eighth, ninth, twelfth and thirteenth rows are encrypted with the encrypted portions being shown as E. In practice the matrix is larger than shown, and the higher order columns would likewise be encrypted. If, for example, S were selected to be 2, the above columns would be encrypted as well as the sixth, tenth and fourteenth columns. In a larger matrix the encryption would follow the same pattern.

FIG. 8 is a pseudo-code flow diagram illustrating how the two-dimensional data matrix shown in FIGS. 6 and 7 is encrypted.

The definitions below, apply in the following description:

IWidth=Image Width,

IHeight=Image Height

The legend for the invert bits function at steps S211 and S215 is as follows:

InvertBits(ImageBuffer, horizontal position, vertical position, areaWidth, areaHeight).

At step S201 an external source provides a randomized seed value and at step S202 the seed is set in the random number generator of the CPU 30 (FIG. 2). At step S203 the "stripe height" (S) is generated by the random number generator and may be a number from 1 to 5. As previously explained relative to FIGS. 6 and 7, S is the number indicative of successive rows and columns following each mth row and each nth column that are encrypted during each encryption pass. At step S204 the entire image in the image buffer is complemented. This is an optional step, and is used to confuse the data to help prevent cracking the encryption code. At step S205 the seed in the random number generator is reset. At step S206 the number of passes Z is generated by the random number generator, and by way of example is chosen to be a number between 3 and 37. At step S207 the current pass Z is initialized to 0 and the process goes to step S208, by way of a connector 300 where the horizontal interval m is randomly chosen by the random number generator to be a number between 2 and 19.

At step S209 the vertical interval n is randomly chosen by the random number generator to be a number between 2 and 19.

At step S210 the current row is initialized to the horizontal interval m. For example, as shown in FIG. 7, m is initialized to 3 and S is 1. The process then goes to step S211 via connector 301 and the data bits in the image buffer are complemented for row 3 and the successive following row 4. At step S212 the horizontal interval is added to the current row, that is m is added to m (3+3) and the process is now at row 6, and at step 213 a determination is made as to whether or not the current row is less than the image height which is M. Since it is less, a return is made to the connector 301 via line 302 and steps S211, S212 and S213 are repeated until the current row is equal to the image height, that is each of the mth rows and the following successive S columns following each mth row have been encrypted by complementation.

At step S214 the current column is initialized to the vertical interval n. For example, as shown in FIG. 8 n is initialized to 4 and S is 1. The process proceeds to step S215 via connector 303 and the data bits in the image buffer are complemented for column 4 and the successive following column 5. At step S216 the vertical interval is added to the current column, that is m is added to m (4+4) and the process is now at column 8, and at step 217 a determination is made as to whether or not the current column is less than the image width N. Since it is less, a return is made to connector 303 via line 304 and the steps S215, S216 and S217 are repeated until the current column is equal to the image width, that is each of the nth columns and the successive following columns S have been encrypted by complementation as shown in FIG. 8.

At step S218 the current pass is incremented from 0 to 1 and a determination is made at step S219 if the current pass is less than the total number of passes Z. Since it is not, a return is made to connector 300 via line 305 and the above-described process is repeated until all Z passes are completed at which time each mth row and the successive following rows S and each nth column and the successive following columns S have been complemented. That is, the entire image buffer has been encrypted.

When executing steps S211 and S215 for complementing the data signals in the rows and the columns respectively, a substitution of a swap row/column or a shift row/column end around function could be implemented to further confuse the data. The random number generator may be utilized to randomly select which of the two substitutions would be utilized.

Figure 9:
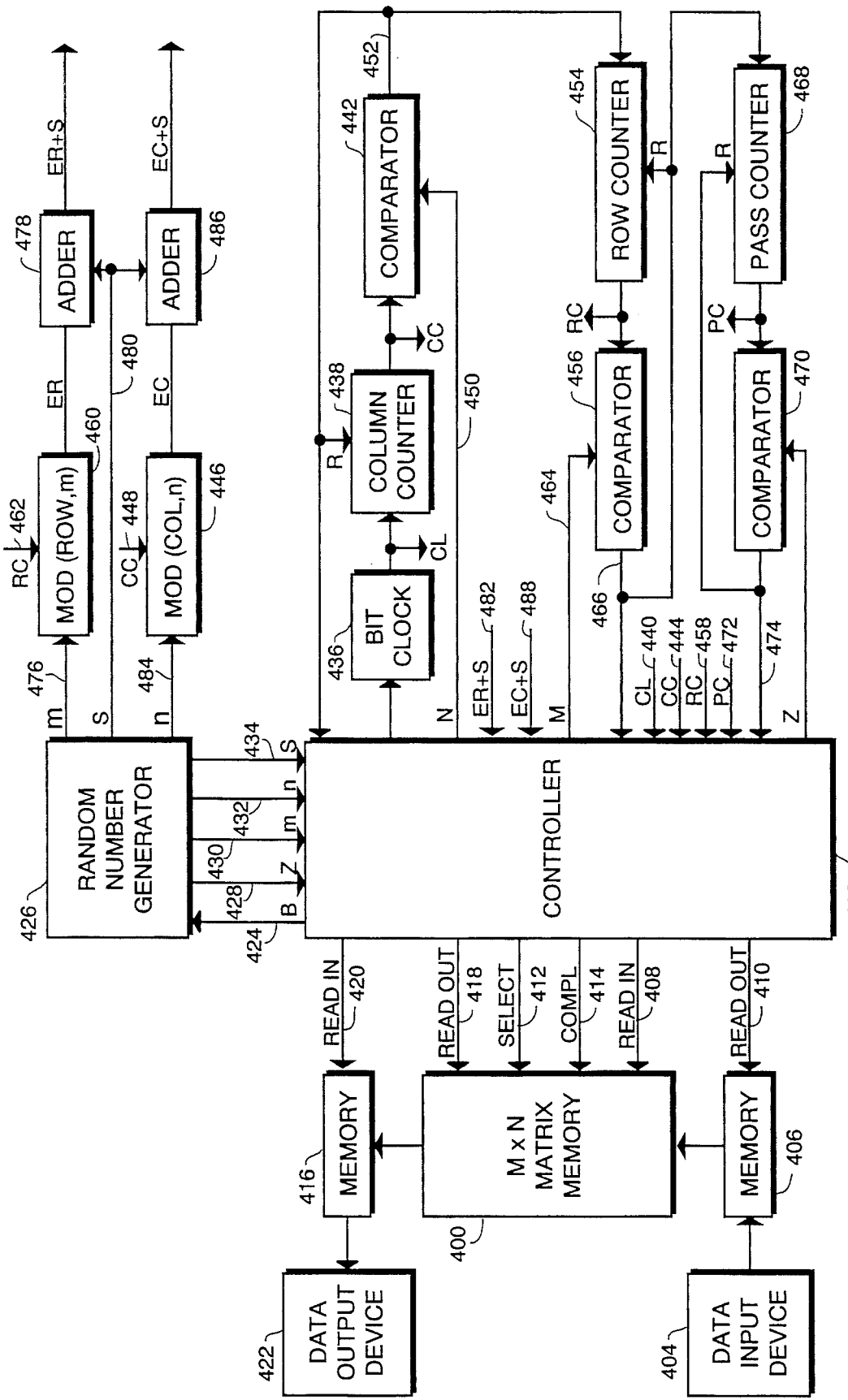
FIG. 9 is a block diagram of an encryption system according to the invention.

Referring now to FIG. 9 which is a block diagram of an encryption system according to the invention, a two-dimensional data matrix memory 400 is encrypted under control of a controller 402. A data input device 404 inputs two-dimensional data to a memory 406. Data is read into memory 400 from memory 406 upon application of a read in signal on line 408 to memory 400 from controller 402, and application of a read out signal on line 410 to memory 406 from controller 402. The data in matrix 400 is encrypted in response to a select signal on line 412 and a complement signal on line 414 from controller 402. The select signal on line 412 is indicative of which rows and columns in the memory are to be encrypted, and the complement signal on line 414 complements the data in the rows and columns to be encrypted. In practice an Exclusive-OR (X-OR) technique may be utilized to perform the complementation. Assuming the complement signal is a "1" and data in a given bit position in a column or row to be encrypted is a "0", the X-OR operation results in a "1" in the given bit position. Conversely, if the data in the given bit position is a "1", the X-OR operation results in a "0" in the given bit position.

Once the encryption is complete, the encrypted data may be read from memory 400 to a memory 416 in response to a read out signal 418 and a read in signal 420 from controller 402. The encrypted data now in memory 416 may be provided to an output device 422.

In practice, the data input device 402 and the data output device 422 may be in the same apparatus. For example, the input and output devices may be part of the facsimile apparatus 20 (FIG. 1).

In response to a control signal B on line 424 from controller 402, a random number generator 426 generates signals indicative of the number of encryption passes Z to be made through the data in the M×N matrix memory 400, the numbers m and n which are indicative of each mth row and each nth column in matrix memory 400 which are to be encrypted and the number S which is indicative of the stripe height. These random numbers Z, m, n and S are provided via lines 428, 430, 432 and 424, respectively, to controller 402.

The technique of encrypting the M×N matrix memory 400 is described for a left-to-right, top-to-bottom encryption of matrix memory 400. It is to be appreciated however that other techniques may be utilized as previously explained.

A bit clock 436 generates clock pulses CL at a frequency corresponding to a rate at which each bit position in matrix memory 400 is to be scanned. The clock pulses CL are applied to a column counter 438 and to controller 402 via line 440. The column counter 438 counts the clock pulses CL and provides a column count to a comparator 442, to controller 402 via a line 444 and to a MOD(col,n) arithmetic unit 446 via line 448. The number of columns N in the matrix is provided to comparator 442 from controller 402 via line 540. When the column count CC equals N, every column in a given row has been scanned. Since this is a left to right top to bottom scan, row O has been completely scanned from column O to column N. A compare signal on line 452 is applied to controller 402, to a reset terminal R of column counter 438 and to a row counter 454.

The row count in row counter 454 is incremented to 1, and the reset column counter counts from column O to column N of row 1. Thus, each time column counter 438 reaches a count of N, row counter 454 is incremented. A row count RC is provided to a comparator 456, to controller 402 via line 458 and to a MOD(row,m) arithmetic unit 460 via line 462. The number of rows M in the matrix is provided to comparator 456 from controller 402 via line 464. When the row count RC equals M, every row O to M in the matrix has been scanned top-to-bottom. A compare signal on line 466 is applied to controller 402, to a reset terminal R of row counter 454 and to a pass counter 468.

The pass count PC in pass counter 468 is incremented and is provided to a comparator 470 and to controller 402 via line 472. The incrementation of the pass count PC is indicative of the completion of an encryption pass through the data in the M×N matrix 400. In response to an incremented PC, controller 402 generates a control signal B on line 424 to random number generator 426 for generating new values for Z, m, n and S for the following pass. The number of passes Z is provided to the comparator 470, and when PC equals Z, the encryption of matrix 400 is complete and a compare signal is provided on line 474 to controller 402 and a reset terminal R of pass counter 468. The controller then can read out the encrypted data from matrix memory 400 as previously explained.

In a given encryption pass, which rows and columns are encrypted is controlled by random number generator 426. The MOD(row,m) arithmetic unit 460 receives as inputs, m from random number generator 426 on line 476 and the row count RC on line 462. If MOD(row,m)=0 for a given row count RC, that row is to be encrypted, and an encrypt row signal ER is provided to an adder 478 to be added to the stripe height S provided on line 480 from random number generator 426. An encrypt signal ER+S is provided to controller 402 via line 482, which signal is indicative of which row and the following S rows are to be encrypted.

The MOD(col,n) arithmetic unit 446 receives as inputs, n from random number generator 426 on line 484 and the column count CC on line 448. If MOD(col,n)=0 for a given column count CC, that column is to be encrypted, and an encrypt column signal EC is provided to an adder 486 to be added to the stripe height S provided on line 480. An encrypt signal EC+S is provided to controller 402 via line 488, which signal is indicative of which column and the S following columns are to be encrypted.

Each time the controller 402 receives the signal ER+S or EC+S, a select signal is generated on line 412 for selecting the corresponding rows or columns for encryption by the complement signal on line 414, as previously explained.

If encrypted data is stored in matrix memory 400, it is decrypted identically to the encryption process described above.

A random row and column data signal encryption method for two-dimensional data has been described in which the format of the data is retained when encrypting, resulting in being able to both process and distribute unencrypted and encrypted data in the same manner.

What is claimed is:

1. A method of encrypting at least part of a M row by N column matrix of data, said method comprising the steps of:

encrypting each mth row of the M rows of original data and each nth column of the N columns of original data, with m and n being integers;

forming a M row by N column new matrix of data which includes each encrypted mth row and nth column of data and each unencrypted row and column of original data; and varying m and n and repeating said encrypting step with the varied m and n.

2. The method of claim 1, wherein each mth row and nth column of original data is encrypted by taking a binary complement of the original data in each mth row and nth column of the matrix of data.

3. The method of claim 2, wherein in said varying step m and n are varied randomly.

4. The method of claim 1, including the step of:

forming said M row by N column matrix of data from non-two-dimensional data in a file format by computing a square root of a binary length of a data file of the non-two-dimensional data.

5. The method of claim 1, wherein the data is binary image data.

6. The method of claim 5, wherein each mth row and nth column of binary image data is encrypted by taking a binary complement of the binary data in each mth row and nth column of the matrix of data.

7. The method of claim 5, further comprising a second encryption step wherein m and n are randomly varied.

8. A method of encrypting at least part of a M row by N column matrix of data, said method comprising the steps of:

encrypting each mth row of the M rows of original data and each nth column of the N columns of original data, with n and m being integers that are randomly varied in each of Z passes through the data; and forming a M row by N column new matrix of data which includes each mth row and nth column of encrypted data and the unencrypted rows and columns of original data.

9. The method of claim 8, wherein each mth row and nth column of original data is encrypted in each pass by taking a binary complement of the data in each mth row and nth column of the matrix of data.

10. The method of claim 9, further comprising a second encryption step wherein m and n are randomly varied.

11. The method of claim 10, wherein said data is binary image data.

12. The method of claim 8, including the step of:

forming the M row by N column matrix of data from non-two-dimensional data in a file format by computing a square root of a binary length of the file.

13. A method of encrypting a M row by N column matrix of data, said method comprising the steps of:

encrypting said matrix of data by multiple encryption passes through the data, wherein each encryption pass further comprises taking a binary complement of the data in each mth row of the M rows of data and each nth column of the N columns of data, and wherein m and n are integers; and randomly varying m and n in each encryption pass.

14. The method of claim 13, including the step of:

randomly selecting a number of encryption passes through the data.

15. The method of claim 14, wherein m and n are randomly selected for each pass by a random number generator.

16. The method of claim 13, including the step of:
selecting at least one successive row following each nth row and at least one successive column following each mth column to be encrypted in each encryption pass.

17. The method of claim 13, including the step of:
taking a binary complement of the entire said matrix of data prior to beginning the multiple encryption passes.

18. A method of encrypting an M row by N column matrix of data, said method comprising the steps of:
   a) selecting a number of encryption passes Z to be made through the matrix of data;
   b) selecting integers m and n which determine that each mth row and each nth column are to be encrypted in each encryption pass;
   c) selecting an integer S which determines that S successive rows following each mth row and S successive columns following each nth column are to be encrypted in each encryption pass; and
   d) performing Z encryption passes through the matrix of data, each encryption pass further comprising the step of taking a binary complement of the data in each mth row and the S successive following rows of the M rows of data and each nth column and the S successive following columns of the N columns of data.

19. The method of claim 18, including the step of:
taking a binary complement of the entire M row by N column matrix of data prior to performing steps a)–d).

20. The method of claim 19, wherein at least one of Z, m, n and S are randomly varied.

21. The method of claim 18, wherein at least one of Z, m, n and S are randomly varied.

22. The method of claim 18, wherein initially a binary complement of each mth row and the S successive following rows is taken, and then a binary complement of each nth column and the S successive following columns is taken, or vice versa.

23. Apparatus for encrypting at least part of an M row by N column matrix of data, comprising:
   encryption means for performing an encryption pass wherein each mth row of the M rows of original data and each nth column of the N columns of original data are encrypted, and wherein m and n are integers;
   means for forming a M row by N column new matrix of data which includes each encrypted mth row and nth column of data and the unencrypted rows and columns of original data; and
   varying means for varying m and n and for causing said encryption means to repeat an encryption pass with the varied m and n.

24. The apparatus of claim 23, wherein said encryption means encrypts each mth row and nth column by taking a binary complement of the original data in each mth row and each nth column.

25. The apparatus of claim 24, wherein said varying means varies m and n randomly in each of plural encryption passes through the data.

26. The apparatus of claim 25, wherein the data is image data.

27. Apparatus for encrypting a M row by N column matrix of data, comprising:
   means for encrypting said matrix of data by multiple encryption passes through the data, wherein said means for encrypting further comprises means for performing each encryption pass by taking a binary complement of the data in each mth row of the M rows of data and each nth column of the N columns of data, with m and n being integers; and
   means for randomly varying m and n in each encryption pass.

28. The apparatus of claim 27, including:
   means for selecting at least one successive row following each mth row and at least one successive column following each nth column to be encrypted in each encryption pass.

29. The apparatus of claim 28, including:
   means for taking a binary complement of the entire said matrix of data prior to beginning the multiple encryption passes.

30. Apparatus for encrypting a M row by N column matrix of data, comprising:
   means for selecting a number of encryption passes Z to be made through the data;
   means for selecting integers m and n which determine that each mth row and each nth column are to be encrypted in each encryption pass;
   means for selecting an integer S which determines that S successive rows following each mth row and S successive columns following each nth column are to be encrypted in each encryption pass; and
   means for taking a binary complement of the data in each mth row and the S successive following rows of the M rows of data and each nth column and the S successive following columns of the N columns of data in each of the Z encryption passes.

31. The apparatus of claim 30, including:
   means for randomly varying at least one of Z, m, n and S.

32. The apparatus of claim 30, wherein said means for taking a binary complement of the data further includes means for initially taking a binary complement of each mth row and the S successive rows, and then taking a binary complement of each nth column and the S successive columns, or vice versa.

33. Encryption apparatus comprising:
   input means for inputting data to be encrypted as a M row by N column matrix;
   designating means for designating a number of encryption passes Z to be made through the data;
   selecting means for selecting integers m and n and for varying m and n between each encryption pass;
   encrypting means for performing Z encryption passes through the data, wherein said encrypting means further comprises means for performing each encryption pass by encrypting each mth row of the M rows of data and each nth column of the N columns of data, whereby the rows and columns that are encrypted in each encryption pass vary in accordance with the variation of m and n between encryption passes; and
   output means for outputting the encrypted data.

34. Encryption apparatus according to claim 33, wherein said input means is comprised by an optical scanner.

35. Encryption apparatus according to claim 34, wherein said output means is comprised by electronic data transmission means.

36. Encryption apparatus according to claim 35, wherein said apparatus is comprised by facsimile equipment in which said scanner is a facsimile scanner and in which said electronic data transmission means is a facsimile modem.

37. Encryption apparatus according to claim 33, further comprising a decryption apparatus which includes:

second input means, coupled to said output means, for receiving encrypted data from said encryption apparatus;

second designating means for designating a number of decryption passes Z1 to be made through the encrypted data, wherein the number of decryption passes Z1 is the same as the number of encryption passes Z;

second selecting means for selecting integers m1 and n1 and for varying m1 and n1 between encryption passes, wherein m1 and n1 are selected so as to be the same as integers m and n selected by said selection means and are varied the same as said first selecting means;

decrypting means for decrypting the encrypted data by performing Z1 decryption passes, wherein said decrypting means further comprises means for performing each decryption pass by taking a binary complement of every m1th row of the M rows of data and every n1th column of the N columns of data; and means for outputting the decrypted data.

* * * * *